United States Patent
Most et al.

(10) Patent No.: US 10,063,554 B2
(45) Date of Patent: Aug. 28, 2018

(54) TECHNIQUES FOR DETECTING UNAUTHORIZED ACCESS TO CLOUD APPLICATIONS BASED ON VELOCITY EVENTS

(71) Applicant: Microsoft Technology Licensing, LLC., Redmond, WA (US)

(72) Inventors: Yonatan Most, Tel Aviv (IL); Yinon Costica, Tel Aviv (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 97 days.

(21) Appl. No.: 14/954,136

(22) Filed: Nov. 30, 2015

(65) Prior Publication Data

US 2017/0155652 A1   Jun. 1, 2017

(51) Int. Cl.
*H04L 29/06* (2006.01)
*H04L 12/26* (2006.01)

(52) U.S. Cl.
CPC .......... *H04L 63/10* (2013.01); *H04L 43/0876* (2013.01); *H04L 43/16* (2013.01); *H04L 63/0281* (2013.01)

(58) Field of Classification Search
CPC ..... H04L 63/10; H04L 63/0281; H04L 43/16; H04L 43/0876
See application file for complete search history.

(56) References Cited

U.S. PATENT DOCUMENTS

| 8,381,271 | B2 | 2/2013 | Dingwall et al. |
| 8,601,562 | B2 | 12/2013 | Milas |
| 2004/0003112 | A1* | 1/2004 | Alles ................. G06F 9/5011 709/237 |
| 2005/0076230 | A1 | 4/2005 | Redenbaugh et al. |
| 2012/0005256 | A1* | 1/2012 | Cherukuri ................ G06F 8/76 709/203 |

(Continued)

FOREIGN PATENT DOCUMENTS

| WO | 2006034205 A2 | 3/2006 |
| WO | 2013062897 A1 | 5/2013 |

OTHER PUBLICATIONS

"International Search Report and Written Opinion Issued in PCT Application No. PCT/US2016/063703", dated Jan. 25, 2017, 10 Pages.

(Continued)

*Primary Examiner* — Joseph P Hirl
*Assistant Examiner* — J. Brant Murphy
(74) *Attorney, Agent, or Firm* — M&B IP Analysts, LLC (57) ABSTRACT

A system and method for detecting unauthorized access to cloud applications based on velocity events are presented. The method includes identifying a first access attempt to a cloud application at a first time and from a first location; identifying a second access attempt to a cloud application at a second time and from a second location; computing a velocity between the first access attempt and the second access attempt based on the first time, the second time, the first location, and the second location; checking if the computed velocity is greater than a velocity threshold; and generating a velocity event when the computed velocity is greater than the velocity threshold, wherein the velocity event indicates that an access attempt is unauthorized.

21 Claims, 5 Drawing Sheets

(56) References Cited

U.S. PATENT DOCUMENTS

| | | | |
|---|---|---|---|
| 2013/0005296 A1* | 1/2013 | Papakostas | H04L 67/303 |
| | | | 455/405 |
| 2013/0110715 A1* | 5/2013 | Buchhop | G06Q 40/02 |
| | | | 705/42 |
| 2013/0144784 A1* | 6/2013 | Yang | G06Q 20/12 |
| | | | 705/44 |
| 2013/0269018 A1 | 10/2013 | Dingwall et al. | |
| 2014/0173694 A1* | 6/2014 | Kranz | G06F 21/606 |
| | | | 726/4 |
| 2014/0222990 A1* | 8/2014 | Hewitt | H04L 43/16 |
| | | | 709/224 |
| 2015/0365412 A1* | 12/2015 | Innes | H04L 63/08 |
| | | | 726/7 |
| 2016/0057621 A1* | 2/2016 | Bovet | H04W 12/06 |
| | | | 455/411 |
| 2016/0248773 A1* | 8/2016 | Bildoy | H04L 63/10 |

OTHER PUBLICATIONS

"Second Written opinion Issued in PCT Application No. PCT/US2016/063703", dated Jul. 18, 2017, 5 Pages.

"International Preliminary Report on Patentability Issued in PCT Application No. PCT/US2016/063703", dated Oct. 20, 2017, 6 Pages.

Hearn, "Google Security Blog; An Update on Our War Against Account Hijackers", Feb. 19, 2013, url: https://security.googleblog.com/2013/02/an-update-on-our-war-against-account.html.

\* cited by examiner

TECHNIQUES FOR DETECTING UNAUTHORIZED ACCESS TO CLOUD APPLICATIONS BASED ON VELOCITY EVENTS

TECHNICAL FIELD

The disclosure generally relates to securing applications implemented in cloud-computing platforms, and more particularly to techniques for enabling application-level access control to such applications.

BACKGROUND

In recent years, an increasing number of providers have begun offering the ability to create computing environments in the cloud. For example, in 2006, Amazon Web Services™ (also known as AWS) launched a service that provides users with the ability to configure an entire environment tailored to an application executed over a cloud platform. In general, such services allow for developing scalable applications in which computing resources are utilized to support efficient execution of the applications.

Organizations and businesses that develop, provide, or otherwise maintain cloud-based applications have become accustomed to relying on these services and implementing various types of environments, from complex websites to applications and services provided as software-as-service (SaaS) delivery models. Such services and applications are collectively referred to as "cloud applications."

Cloud applications are typically accessed by users using a client device via a web browser. Cloud applications include, among other things, e-commerce applications, social media applications, enterprise applications, gaming applications, media sharing applications, storage applications, software development applications, and so on. Many individual users, businesses, and enterprises turn to cloud applications in lieu of "traditional" software applications that are locally installed and managed. For example, an enterprise can use Office® 365 online services for email accounts, rather than having an Exchange® Server maintained by the enterprise.

As greater reliance is made on cloud applications, securing access to such cloud applications becomes increasingly important. For example, for an e-commerce application executed in a cloud-based platform, any unauthorized access and/or data breach must be prevented to ensure protection of sensitive customer and business information such as, e.g., credit card numbers, names, addresses, and so on.

Providers of cloud computing platforms (e.g., Amazon) offer various security capabilities primary designed to protect their infrastructure against cyber-attacks (e.g., DoS, DDoS, etc.). However, cloud computing platforms are not designed to detect any unauthorized and/or unsecured access to cloud applications hosted therein.

Most, if not all, cloud applications implement a native access control often limited to a username and password (as known as login information). More advanced solutions would require another layer of authentication using, for example, a software certificate and/or two-step authentication. However, the authentication solutions currently available are agnostic to the user's device.

That is, a user can authenticate from any client device using the same credentials and have the same trust level and permission to a cloud application's functions regardless of the client device being utilized to access the application. For example, a user can access an Office® 365 email account both from his/her work computer and from his/her home computer using the same login information, and will have the same degree of access from both computers.

As not all client devices are configured with the same security level, the existing approach for gaining access to cloud applications exposes an enterprise to significant vulnerabilities. Referring to the above example, the work computer may be fully secured, while the home computer may not be installed with anti-malware software. As such, any access from the home computer to sensitive documents (e.g., emails) can be downloaded and distributed by malicious code that may exist in the home computer. More importantly, a hacker can access to contents of a cloud application merely through stealing or revealing the login information of legit users. Such information can easily be revealed or compromised through tracking cookies, snapping to unsecured networks, and the like.

Further, conventional authentication solutions do not distinguish between managed and unmanaged client devices attempting to access a cloud application. A managed device is typically secured by, for example, IT personnel of an organization, while an unmanaged device is not. Referring to the above example, the work computer is a managed device while the home computer is an unmanaged device.

It would therefore be advantageous to provide an efficient solution for detecting unauthorized access attempts to cloud applications.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for detecting unauthorized access to cloud applications based on velocity events. The method comprises: identifying a first access attempt to a cloud application at a first time and from a first location; identifying a second access attempt to a cloud application at a second time and from a second location; computing a velocity between the first access attempt and the second access attempt based on the first time, the second time, the first location, and the second location; checking if the computed velocity is greater than a velocity threshold; and generating a velocity event when the computed velocity is greater than the velocity threshold, wherein the velocity event indicates that the second access attempt is unauthorized.

The disclosed embodiments also include a system for method for detecting unauthorized access to cloud applications based on velocity events. The system comprises: a processing unit; and a memory, the memory containing instructions that, when executed by the processing unit, configure the system to: identify a first access attempt to a cloud application at a first time and from a first location; identify a second access attempt to a cloud application at a second time and from a second location; compute a velocity between the first access attempt and the second access attempt based on the first time, the second time, the first location, and the second location; check if the computed velocity is greater than a velocity threshold; and generate a velocity event when the computed velocity is greater than the velocity threshold, wherein the velocity event indicates that the second access attempt is unauthorized

BRIEF DESCRIPTION OF THE DRAWINGS

The foregoing and other objects, features and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

Figure 1:
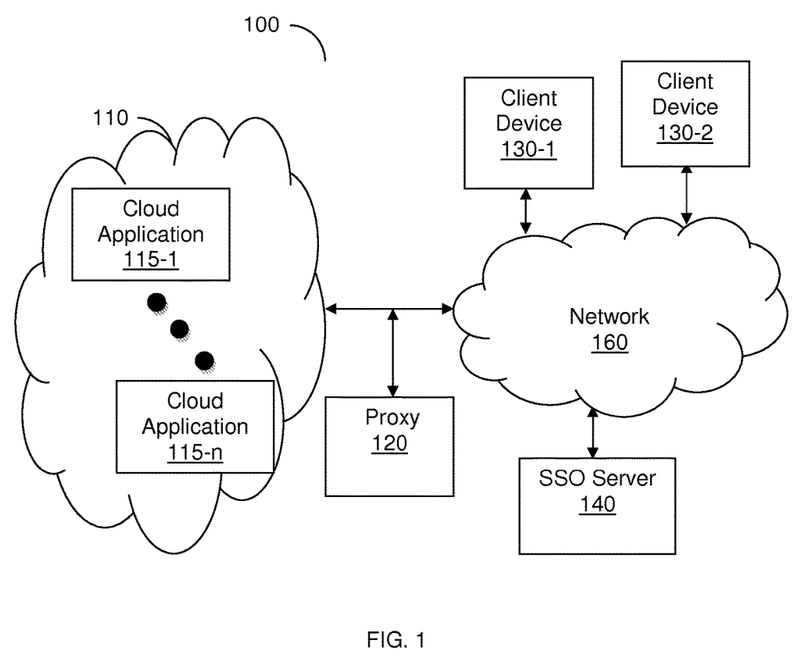
FIG. 1 is a schematic diagram of a networked system utilized to describe the disclosed embodiments.

FIG. 1 is an exemplary and non-limiting diagram of a networked system 100 utilized to describe the various disclosed embodiments. The networked system 100 includes a cloud computing platform 110, which may be a private cloud, a public cloud, or a hybrid cloud providing computing resources to applications or services executed therein. In the exemplary FIG. 1, a plurality of cloud applications 115-1 through 115-n (hereinafter referred to individually as a cloud application 115 and collectively as cloud applications 115) are executed in the platform 110. As noted above, a cloud application may include, among other things, an e-commerce application, a collaboration application, an office and messaging application, a social media application, an enterprise application, a gaming application, a media sharing application, and the like.

The networked system 100 further includes a managed proxy 120, client devices 130-1 and 130-2, and a single sign on (SSO) server 140 that are communicatively connected to a network 160. The network 160 may be, for example, a wide area network (WAN), a local area network (LAN), the Internet, and the like. Each of the client devices 130-1 and 130-2 may include, for example, a personal computer, a laptop, a tablet computer, a smartphone, a wearable computing device, or any other computing device. Either one of the client devices 130-1 and 130-2 may be a managed or unmanaged device. The client devices 130-1 and 130-2 may belong to the same user or may be the same device. Two client devices are illustrated merely to distinguish between access attempts performed from two different geographical locations and without limitation on any of the disclosed embodiments.

It should be noted that, although two client devices 130 are depicted in FIG. 1 merely for the sake of simplicity, the embodiments disclosed herein can be applied to a plurality of client devices.

The SSO server 140 allows the user of the client devices 130 to log in once and gain access to systems/applications of the enterprises without being prompted to log in again at each of them. To this end, the SSO server 140 typically utilizes the lightweight directory access protocol (LDAP) databases and/or persistent cookies. In an embodiment, a request to access any cloud application 115 is sent from any of the client devices 130 to the SSO server 140. In that embodiment, the managed proxy 120 is configured to authenticate such requests, as will be described in detail below. In certain implementations, an IdP provisioning can be used instead of a SSO server 140.

According to the disclosed embodiments, access to the cloud application 115 or any of its components is controlled and enforced by the managed proxy 120. The managed proxy 120 is configured to support any token-based authentication protocol. Such protocols include, but are not limited to, WS-Federation®, security assertion markup language (SAML), WS-TRUST, and the like.

According to the disclosed embodiments, in order to access the application 115, a client device such as, e.g., the device 130-1, by means of its web browser, receives a login webpage of the cloud application 115. Then, the client device 130-1 is directed to the SSO server 140. When the user is successfully authenticated by the SSO server 140, an authentication token is transferred from the SSO server 140 to the managed proxy 120. In one implementation, the SSO server 140 is configured to redirect the client device's 130-1 browser to the managed proxy 120. If the managed proxy 120 does not grant the user access to the cloud application, an error page is returned to the user. In some implementations, only a limited access (e.g., view only mode, disable downloading of documents, etc.) is granted to the application upon detection of an authorized access.

In an embodiment, the managed proxy 120 is configured to determine whether or not to grant a client device 130-1 or 130-2 access to the cloud application 115 based on identification of a velocity event. A velocity event is defined as two subsequent or access attempts by a user to the same application or different applications during a time interval that is not sufficiently long given the difference in distance between the access attempts. An access attempt is any action that could result in accessing information in the cloud application 115 and may be, but is not limited to, a login to an application, viewing a document, uploading a file, downloading a file, and so on. In an embodiment, unsuccessful access attempts may be ignored for purposes of identifying velocity events. In an embodiment, sufficiency of lengths of time between access attempts may be based on a predefined velocity (e.g., the velocity of a commercial airliner) as compared to a determined velocity for the current access attempt.

Specifically, the managed proxy 120 is configured to detect velocity events and to take protective action based on a security policy defined for the cloud application 115 or the cloud platform 110. The policy may block access to the cloud application 115, raise a security alert, ignore a velocity event, grant only limited access to the cloud application 115, and so on. Each velocity event represents a potentially unauthorized access. In an embodiment, a velocity event may be detected by the managed proxy 120 based in part on information regarding access attempts received or retrieved from the SSO server 140.

A velocity event is detected when two access attempts could not be performed by the same user. The managed proxy 120 is configured to determine a distance between the locations of the access attempts and a difference in time between the access attempts. Based on the determined distance and time difference, a minimum velocity required to successfully travel from the prior location to the subsequent location is determined. In an embodiment, this required velocity may be compared to a predefined threshold velocity representing a maximum possible speed of the user. If the required velocity is above the predefined threshold velocity, a velocity event may be detected and access to the cloud application 115 may be blocked.

As a non-limiting example of detecting a velocity event, the managed proxy 120 receives information about a cloud application access attempt at 1:00 PM in New York, N.Y. Subsequently, the managed proxy 120 also receives information about an access attempt, from the same user, at 3:00 PM in Las Vegas, Nev. In this example, the predefined threshold velocity for the user is 450 miles per hour (the resulting speed if the user is taking a commercial airline that averages 450 miles per hour over the trip). The distance between Las Vegas and New York is determined to be roughly 2250 miles. The time difference is determined to be 2 hours. Thus, the required velocity is determined to be 1125 miles per hour. Because the required velocity exceeds the predefined threshold velocity, the managed proxy 120 determines that the attempted access is illegitimate and blocks access to the cloud application.

In an embodiment, the information about a user who has performed the access attempts is retrieved from the SSO server 140. A user can be identified by a user name, a user ID, or any other unique identifier.

In an embodiment, the managed proxy 120 is configured to detect velocity events across two more different web applications (hereinafter "cross-application velocity event"). A cross-application velocity event occurs when a user who accessed a first cloud application 115-1 attempts to access another cloud application 115-2 from the same or a different client device 130 such that a velocity event is detected. The detection may be based on information regarding two or more access attempts received from the SSO server 140. As a non-limiting example, if a user first accesses an email application in Philadelphia, Pa., and 5 minutes later accesses a cloud storage application in San Jose, Calif., a cross-application velocity event may be detected.

Specifically, the time and location of each attempt to access a first cloud application 115 are detected regardless of the application. A velocity event is determined respective of the times and locations noted above. Upon detecting a velocity event, the managed proxy 120 is configured to take protective measures based on at least one rule. Protective measures may include, but are not limited to, blocking access to the cloud application 115, raising a security alert, ignoring the velocity event, or granting only limited access to the cloud application 115. The at least one rule may be predefined. In an embodiment, upon detecting a velocity event, the managed proxy 120 may log-out a user from an application 115 the user is already connected to.

The identification of cross-application access attempts is based on, for example, a username, the user's group or department, time of attempted access, an application being accessed, and so on. Such information can be obtained from, for example, the SSO server 140, directory services (e.g., LDAP), and so on.

As a non-limiting example of cross-application access denial, a company provides its employees with access to an email application and a cloud storage application. A user operating a client device 130-1 successfully logs in to the email application from NY. A few minutes later, another access attempt to the cloud storage application 115, from NV and using the same username, is detected. The scenario will trigger a velocity event, even though the attempts were made to different cloud storage applications 115.

In an embodiment, attributes related to any access attempt performed by the user, either successful or unsuccessful, are collected by the managed proxy 120 and added to a user profile. In an embodiment, the user profile is utilized to learn the behavior of a legitimate user over time, thereby reducing the occurrence of false positive alerts or denials of access to the cloud applications 115.

In a non-limiting embodiment, a risk score is computed based on the user profile. The risk score decreases the likelihood for a false positive alert. An exemplary determination of risk scores is described further herein below with respect to FIG. 4.

In a preferred embodiment, the risk score computed for a velocity attempt may be compared to a certain threshold. The threshold may be different for users and/or for different applications. For example, a new employee of the organization may be set with a low threshold value indicating high sensitivity for velocity events, whereas a senior employee may be set with a high threshold value indicating low sensitivity to velocity event. Further, applications that maintain confidential applications may be less tolerant (high threshold value) to velocity events. The thresholds may be saved in a user profile. A user may be assigned different threshold values respective of different applications.

In an embodiment, the risk scores' respective computed velocity events may be considered by the managed proxy 120 to determine an overall threat for the cloud application 115.

In an embodiment, a user profile further defines a plurality of user attributes including, for example, a user identity (e.g., a username), user group (e.g., HR department), and a user account history. The user account history is defined respective of past user activities (typically, suspicious and/or malicious activities) associated with the user account. In an embodiment, the account history includes locations and/or times from which past login access to the cloud applications have been performed. For example, a user account history may define a previous attempt to access the user's email in California occurring five minutes after attempting to access the user's email in New York. The user account history may further define habits of the user such as, for example, timing and frequency of logins (e.g., the user accesses his email on average once per hour between 9 AM and 5 PM), previous orders of accessing cloud applications (e.g., the user has previously accessed his email account before accessing his cloud storage account, but not vice versa), and so on.

In an embodiment, the past locations may be categorized such that they are recognized as risky, known, and/or reliable locations of the client devices 130. A location is determined by, for example, its source IP address. In an embodiment, the location determination may further be based on one or more rules for resolving locations based on IP addresses. The location attributes may be a reliability score assigned to particular locations based on, but not limited to, known sources of suspicious activities, known locations of a user in the user account history, and so on.

It should be understood that the embodiments disclosed herein are not limited to the specific architecture illustrated in FIG. 1 and other architectures may be used without departing from the scope of the disclosed embodiments.

Specifically, the managed proxy 120 may reside in the cloud computing platform 110, a different cloud computing platform, or a datacenter connectable to a cloud computing platform. Moreover, in an embodiment, there may be a plurality of managed proxies 120 operating as described hereinabove and configured to either have one as a standby proxy to take control in the event of a failure, to share loads between them, or to split the functions between them.

It should be noted that a managed proxy 120 is shown merely for exemplary purposes and without limitation on the disclosed embodiments. In an embodiment, the proxy 120 may be deployed in the network in other configurations and still provide the disclosed embodiments. Further, the disclosed embodiments for detecting velocity events can be performed by other types of security systems that are commutatively connected to the cloud platform 110 and the SSO 140. The information with respect to access attempts and any information require to determine velocity events can be retrieved from the SSO 140 and/or the cloud platform 110 through an application program interface (API). Further, any detection of velocity alerts can be reported through the API.

Figure 2:
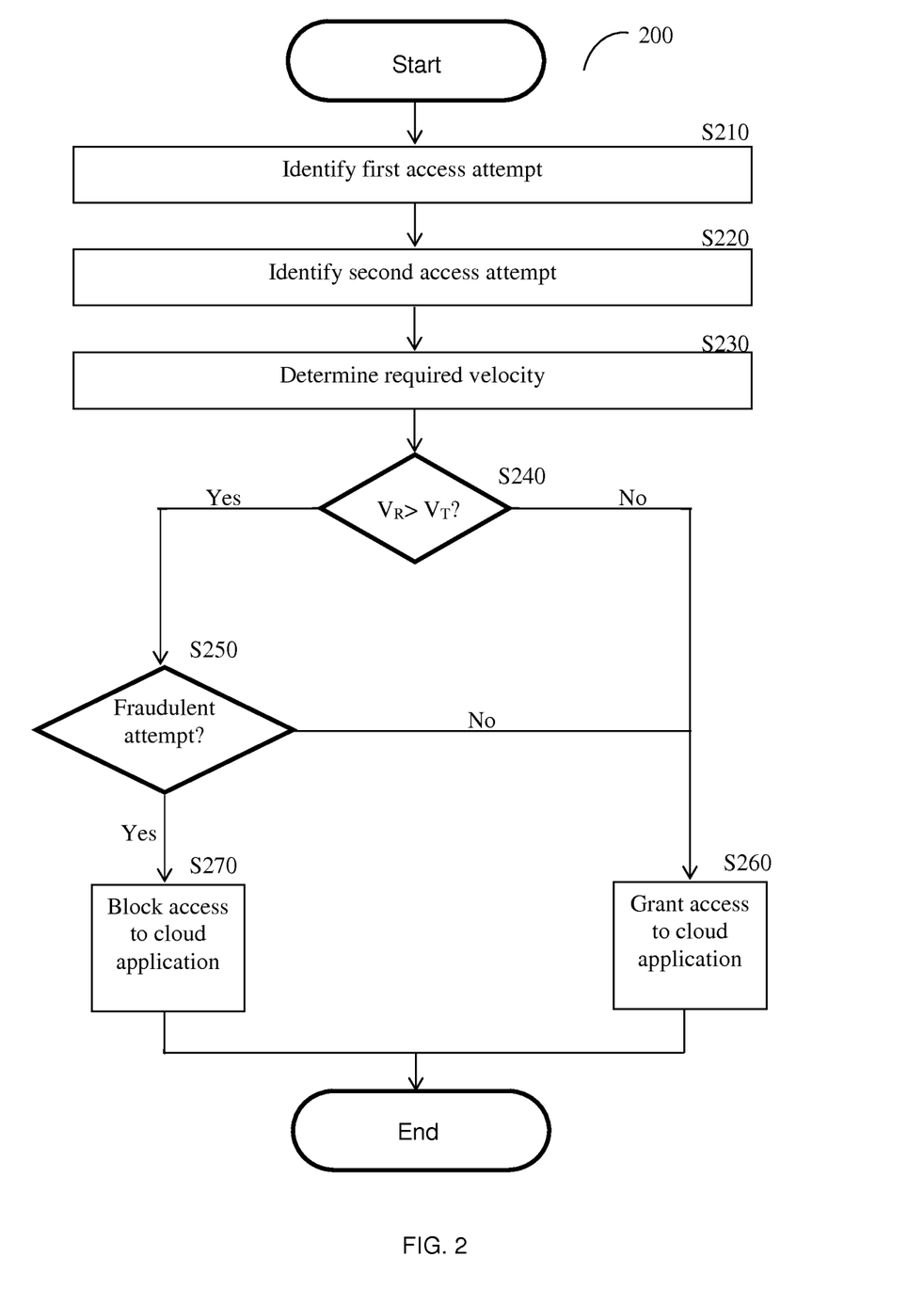
FIG. 2 is a flowchart illustrating the operation of a managed proxy according to one embodiment.

FIG. 2 depicts an exemplary and non-limiting flowchart 200 illustrating the operation of the managed proxy 120 according to an embodiment. In S210, a first access attempt is identified. The identification includes determining the location and time of the access attempt. Each access attempt may be detected based on information regarding log-ins and attempted access received or retrieved from a SSO server (e.g., the SSO server 140). The location of a access attempt may be determined based on, e.g., a source internet protocol (IP) address of the device requesting the log-in. The time of the first access attempt may be determined and recorded at the time of the first access attempt.

In S220, a second access attempt is identified. The identification includes determining a time and location of the second access attempt. The location of an access attempt may be determined based on, e.g., a source internet protocol (IP) address of the device requesting the login. The second access attempt may be for the same application as the first attempt, or for a cross-application log-in. Cross-application log-ins are described further herein above with respect to FIG. 1. In S230, a required velocity is determined. A distance between the location of the first access attempt and the location of the second access attempt is determined. Additionally, a difference in time between the time of the first access event and the time of the second access event is determined. The required velocity is determined to be equal to the quotient of the determined distance by the determined time difference. For example, a distance of 100 miles between locations wherein access attempts were made 2 hours apart would yield a required velocity of 50 miles per hour. It should be noted that any units of measurement for time, distance, and/or velocity may be used without departing from the scope of the disclosed embodiments.

In S240, the required velocity ($V_R$) is compared to a predefined threshold velocity ($V_T$) to determine if the required velocity exceeds the threshold velocity. If so, execution proceeds with S250; otherwise, execution proceeds with S260.

In S250, upon determining that the required velocity exceeds the threshold velocity, a velocity event is identified and it is checked whether the velocity event represents a fraudulent attempt to access the cloud application. If so, execution continues with S270; otherwise, execution continues with S260.

To determine whether the access attempt is fraudulent, a risk score may be computed using a decision tree. The risk score may be used to determine whether the velocity event is a false positive. A false positive occurs when the second access attempt was not fraudulent despite the detection of the velocity event. As a non-limiting example, an access attempt via a virtual private network (VPN) connection may not be fraudulent despite triggering a velocity event. The computation of risk scores may be based on information related to previous access attempts as maintained in the user profile. Computation of risk scores using decision trees is described further herein below with respect to FIG. 4.

It should be noted that the risk score may not need to be computed in some embodiments. In such embodiments, upon detection of a velocity event, access to the cloud application may be blocked without determining whether the velocity event is a false positive.

In S260, access to the cloud application is granted if no velocity event was detected or if a detected velocity event was not associated with a fraudulent access attempt. The granted access may be restricted. In an embodiment, access to the cloud application may only be granted if the risk score exceeds a predefined threshold. In another embodiment, information related to the access may be stored for future use. Such future use may include, but is not limited to, determining a decision tree based on attributes associated with granted access attempts.

In S270, the access attempt is identified as fraudulent and is blocked. In a further embodiment, S270 may further include generating an alert regarding the blocked access attempt. In certain implementations, a restricted access to the cloud application may be granted, the access to an already logged application may be blocked, and so on.

Figure 3:
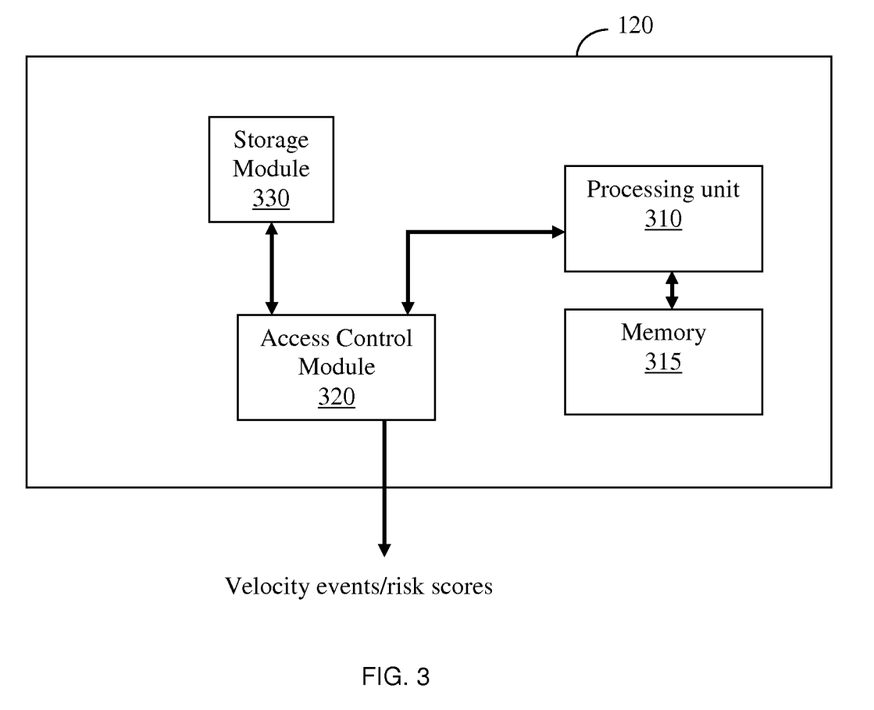
FIG. 3 is a block diagram of a managed proxy according to an embodiment.

FIG. 3 shows an exemplary and non-limiting block diagram of the managed proxy 120 constructed according to an embodiment. The managed proxy 120 may be deployed in cloud-computing platforms, data centers, or as a stand-alone network device. The managed proxy 120 is configured to at least control and enforce access to cloud applications based on access policies as described in greater detail above with respect to FIG. 1.

The managed proxy 120 includes a processing unit 310 coupled to a memory 315, an application-level access control module 320, and a storage module 330. The memory 315 contains instructions that, when executed by the processing unit 310, configure the managed proxy 120 to perform the embodiments described herein.

The processing unit 310 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit 310 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 310 to perform the various functions described herein.

The access control module 320 is configured to verify the attempted unauthorized access to a cloud application based on velocity. Accordingly, the access control module identifies the location and time of each access attempt. For example, one access attempt may be an attempted log-in in Hoboken, N.J. at 4:00 PM. The access control module 320 is further configured to determine a distance between the locations of the access attempts and a difference in time between the access attempts. Based on the determined distance and time difference, a minimum velocity required to successfully travel from the prior location to the subsequent location is determined. In an embodiment, this required velocity may be compared to a predefined threshold velocity representing a maximum possible speed of the user. If the required velocity is above the predefined threshold velocity, the access control module 320 detects a velocity event and may block the attempted access to the cloud application.

In an embodiment, upon detecting a velocity event, the access control module 320 may be further configured to determine if the detected velocity event is a false positive (i.e., that the second attempted access is legitimate even though a velocity event has been detected) based on a determined risk score. Determination of risk scores is described further herein below with respect to FIG. 4. If the detected velocity event is a false positive, the access control module 320 is configured to grant access to the cloud application.

In an embodiment, the access control module 320 is further configured to, upon receiving a request to access a cloud application, identify user attributes maintained in a user profile in the storage module 330. The user attributes may include, for example, a username, the user's group or department, time of attempted access, an application being accessed, past login activities, past login locations, and so on. The storage module 330 is configured to at least maintain a plurality of access policies for each cloud application. The request may comprise an authentication token. The operation of the access control module 320 is discussed in greater detail herein above with respect to FIG. 2.

Figure 4:
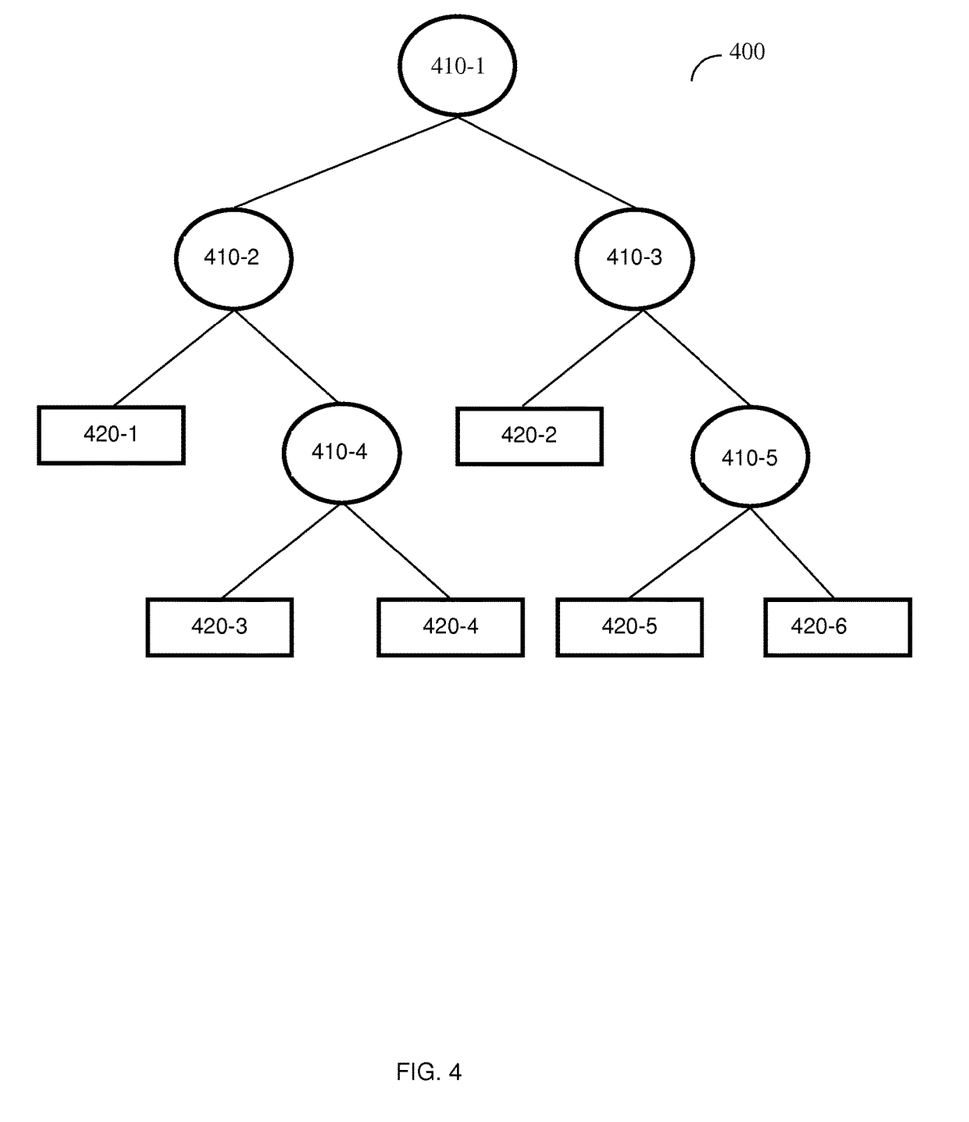
FIGS. 4 and 5 are decision model trees illustrating computation of a risk score according to an embodiment.

FIG. 4 is an exemplary and non-limiting decision model tree 400 illustrating computation of a risk score according to an embodiment. The decision model tree 400 may be based on, for example, attributes associated with previous access attempts that were granted. In an embodiment, the decision model tree 400 may be based on user attributes identified by a user (e.g., a systems administrator of an enterprise) as indicators of valid access attempts. In an embodiment, the decision model tree 400 may be developed automatically based on detection of one or more velocity events. In a further embodiment, the decision model tree 400 may be dynamically updated based on user activities such as, e.g., user access attempts.

Each node 410 in the tree is configured to compare a requirement "R" to a respective user attribute "a" of an access attempt. The user attributes are described further herein above with respect to FIG. 1. The comparison made at each node 410 may be any one of: greater than, less than, equal to, not equal to, identical, and so on. The comparison may be performed on numerical values, Boolean values, strings, and so on.

Each leaf 420 of the tree 400 represents a risk score. That is, in order to determine the risk score, the tree 400 is traversed from a root node 410-1 through the other nodes 410 until reaching a leaf 420. Each leaf 420 may be based on relative numbers of previous true velocity events with similar attributes to the instant velocity event. For example, if an identified velocity event possesses attributes that are similar to a high number of previous velocity events, the likelihood that the velocity event is a "true" velocity event (i.e. not a false positive) will be high. Accordingly, in that example, the risk score represented by the leaf 420 that is associated with those attributes will be high.

As a non-limiting example, the pairs of requirements and access attributes <R1, a1>, <R2, a2>, and <R4, a4> are compared at 410-1, 410-2, and 410-4, respectively. In this example, the risk score is within a scale from 1 to 9, with 9 indicating a high likelihood that the velocity event is a true velocity event (i.e., not a false positive), and 1 indicating a high likelihood that the velocity event is not a true velocity event (i.e., that it is a false positive). The comparisons at 410-1, 410-2, and 410-4 are based on the attributes user identity, device posture, and location, respectively.

In this example, flow through the tree 400 moves to the left as a requirement "R" of a node is met by the attribute "a," and right as the requirement "R" is not met by the attribute "a." Requirement R1 is met by attribute a1, thereby triggering the comparison at node 410-2. R2 is not met by a2 because it is determined that the device posture does not indicate the required security update, thereby triggering the comparison at node 410-4. Requirement R4 is met by attribute a4, thereby resulting in the risk score of 3 that is represented in leaf 420-3. It should be noted that other risk scores may be represented by leaf 420-3 without departing from the scope of the disclosed embodiments.

In an embodiment, the risk score represented by each leaf may be further affected by the values of the attributes and/or by weighted rankings assigned to each node. For example, in the tree 400, the node 410-2 may be weighted more than nodes 410-1 and 410-4. In that example, the degree to which a2 meets or fails to meet R2 may alter the risk scores represented by leaves 420-3 and 420-4 (e.g., increasing the risk score, decreasing the risk score, changing the risk score to a predetermined score and so on). For example, if the ISP through a client device connects is not the enterprise ISP, but rather the user's home ISP, the risk score of leaf 420-3 may be slightly increased (e.g., from 3 to 4). If the device posture indicates that the security update is outdated by several versions, the risk score of leaf 420-3 may be decreased (e.g., from 3 to 2).

Figure 5:
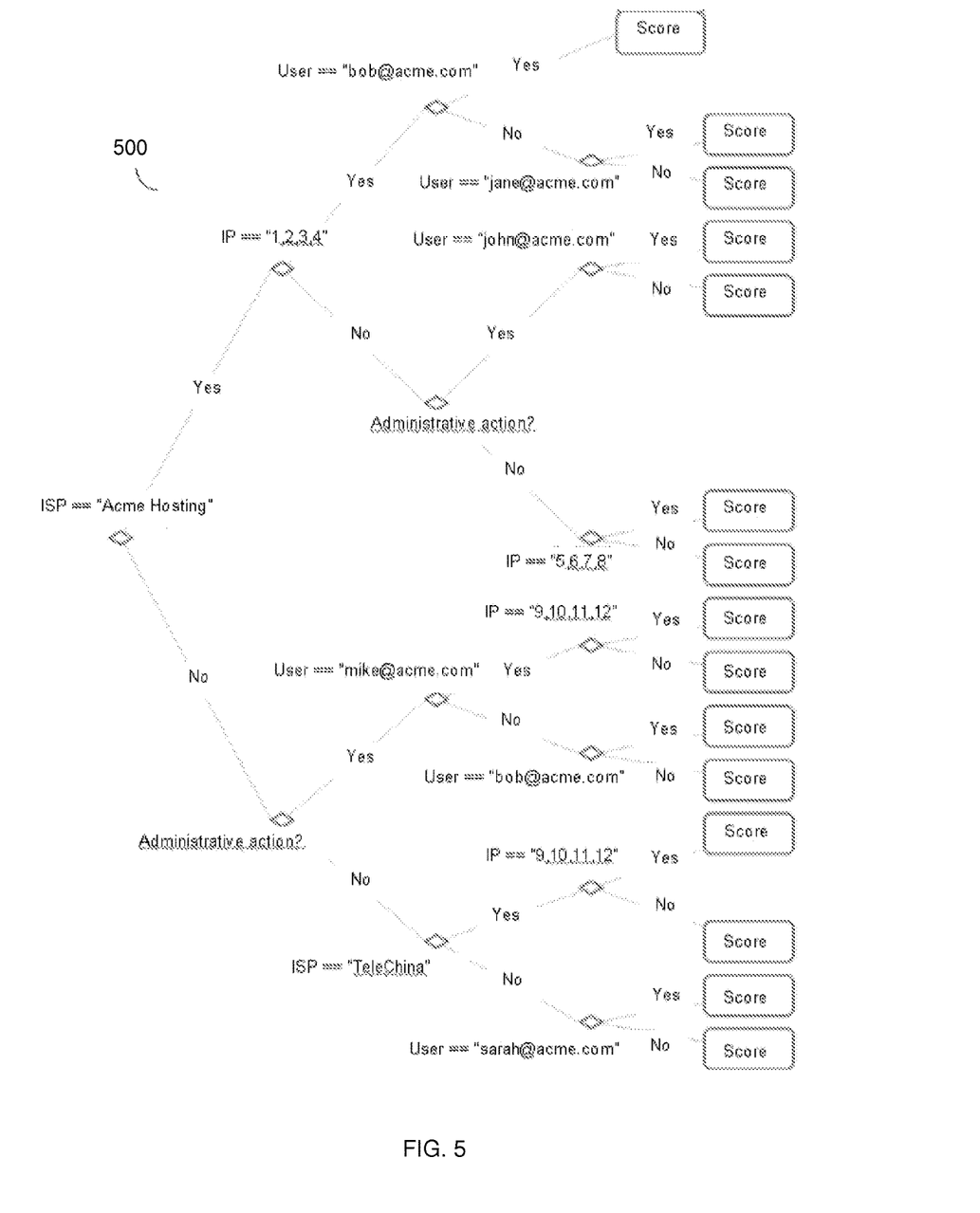

FIG. 5 shows an exemplary and non-limiting decision model tree 500 illustrating computation of a risk score according to an embodiment. It should be noted that the decision model trees 400 and 500 are exemplary and do not limit any of the various disclosed embodiments. Other organizations and types of trees may be utilized without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting unauthorized access to cloud applications based on velocity events, comprising:
    identifying, by a managed proxy device, a first access attempt to a first cloud application at a first time and from a first location;
    identifying, by the managed proxy device, a second access attempt to a second cloud application at a second time and from a second location, wherein the managed proxy device is connected between client devices and a cloud-computing platform hosting the first cloud application and the second cloud application;
    computing a velocity between the first access attempt and the second access attempt based on the first time, the second time, the first location, and the second location;
    checking if the computed velocity is greater than a velocity threshold; and
    generating a velocity event when the computed velocity is greater than the velocity threshold, wherein the velocity event indicates that an access attempt to the second cloud application is unauthorized.

2. The method of claim 1, wherein the velocity threshold is based on a velocity required to travel from the first location to the second location within the difference between the first time and the second time.

3. The method of claim 1, further comprising:
    upon determining that the required velocity is not above the velocity threshold, determining that the second access attempt is authorized.

4. The method of claim 1, wherein the first access attempt and the second access attempt are for different cloud applications.

5. The method of claim 1, further comprising:
    determining whether the velocity event is a false positive;
    upon determining that the velocity event is a false positive, determining that the second access attempt is authorized; and
    upon determining that the velocity event is not a false positive, determining that an access attempt is unauthorized.

6. The method of claim 5, wherein determining whether the velocity event is a false positive further comprises:
    computing a risk score using a decision tree, wherein the determination of whether the velocity event is a false positive event is based on the risk score.

7. The method of claim 6, wherein the decision tree is generated based on at least information related to legitimate access attempts by the user, wherein the decision tree is updated as legitimate access attempts by the user are detected.

8. The method of claim 1, further comprising:
    upon generating a velocity event, activating at least one protective measure based on at least one rule.

9. The method of claim 8, wherein each protective measure is any of: blocking access, raising a security alert, ignoring the velocity event, granting limited access, and logging out a user designated by the same username initiated the first access attempt and the second access attempt.

10. The method of claim 9, wherein each of the first location and the second location is identified based on at least one rule for resolving locations.

11. A non-transitory computer readable medium having stored thereon instructions for causing one or more processing units to execute the method according to claim 1.

12. A system for detecting unauthorized access to cloud applications, the system is connected between client devices and a cloud-computing platform hosting the cloud applications; comprising:
    a processing unit; and
    a memory, the memory containing instructions that, when executed by the processing unit, configure the system to:
    identify a first access attempt to a first cloud application at a first time and from a first location;
    identify a second access attempt to a second cloud application at a second time and from a second location;
    compute a velocity between the first access attempt and the second access attempt based on the first time, the second time, the first location, and the second location;
    check if the computed velocity is greater than a velocity threshold; and
    generate a velocity event when the computed velocity is greater than the velocity threshold, wherein the velocity event indicates that an access attempt is unauthorized to the second cloud application.

13. The system of claim 12, wherein the velocity threshold is based on a velocity required to travel from the first location to the second location within the difference between the first time and the second time.

14. The system of claim 12, wherein the system is further configured to:
    upon determining that the required velocity is not above the velocity threshold, determine that the second access attempt is authorized.

15. The system of claim 12, wherein the first attempt and the second access attempt are for different cloud applications.

16. The system of claim 12, wherein the system is further configured to:
   determine whether the velocity event is a false positive;
   upon determining that the velocity event is a false positive, determine that the second access attempt is authorized; and
   upon determining that the velocity event is not a false positive, determine that an access attempt is unauthorized.

17. The system of claim 12, wherein the system is further configured to:
   compute a risk score using a decision tree, wherein the determination of whether the velocity event is a false positive event is based on the risk score.

18. The system of claim 17, wherein the decision tree is generated based on at least information related to legitimate access attempts by the user, wherein the decision tree is updated as legitimate access attempts by the user are detected.

19. The system of claim 12, wherein the system is further configured to:
   upon generating a velocity event, activate at least one protective measure based on at least one rule.

20. The system of claim 19, wherein each protective measure is any of:
   blocking access, raising a security alert, ignoring the velocity event, granting limited access, and logging out a user designated by the same username initiated the first access attempt and the second access attempt.

21. The system of claim 12, wherein each of the first location and the second location is identified based on at least one rule for resolving locations.

* * * * *